(12) United States Patent
Schubert (10) Patent No.: US 7,563,544 B2
(45) Date of Patent: Jul. 21, 2009

(54) THERMOPLASTIC SEPARATOR FOR ALKALINE ELECTROCHEMICAL CELLS AND PROCESSES FOR THE PRODUCTION THEREOF

(75) Inventor: Mark A. Schubert, Brunswick, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 934 days.

(21) Appl. No.: 10/851,280

(22) Filed: May 21, 2004

(65) Prior Publication Data

US 2005/0260499 A1 Nov. 24, 2005

(51) Int. Cl.
*H01M 2/16* (2006.01)

(52) U.S. Cl. ............... 429/254; 429/249; 429/247; 429/144; 429/142; 429/163; 429/129

(58) Field of Classification Search ............. 429/129, 429/144, 142, 163, 247, 249, 253, 254
See application file for complete search history.

(56) References Cited

U.S. PATENT DOCUMENTS

| | | | | |
|---|---|---|---|---|
| 3,684,580 | A | 8/1972 | Lysaght et al. ............... 136/146 |
| 4,285,751 | A | 8/1981 | Feinberg et al. ............. 156/242 |
| 4,315,062 | A | 2/1982 | Clarizio ....................... 429/246 |
| 4,376,794 | A | 3/1983 | Machi et al. | |
| 5,549,988 | A | 8/1996 | Reichert et al. ............. 429/192 |
| 5,639,573 | A * | 6/1997 | Oliver et al. ................. 429/303 |
| 5,658,685 | A * | 8/1997 | Oliver ......................... 429/309 |
| 6,849,702 | B2 * | 2/2005 | Callahan et al. ............. 429/303 |
| 2004/0166416 | A1 * | 8/2004 | Randell e et al. ............ 429/317 |

FOREIGN PATENT DOCUMENTS

| | | |
|---|---|---|
| FR | 2463513 | 2/1981 |
| JP | 58018870 A | 2/1983 |
| JP | 06338311 | 12/1994 |
| JP | 10/208722 A | 8/1998 |
| JP | 2000/138048 A | 5/2000 |
| WO | WO 02/101852 A | 12/2002 |
| WO | WO 03/012893 A | 2/2003 |

OTHER PUBLICATIONS

Okubo, Masayoshi et al. *Variation of the Morphology of a Carboxylated Polymer Film by Alkali Treatement*, Colloid Polym Sci (2002) 280:574-578, Apr. 5, 2002.

* cited by examiner

*Primary Examiner*—Laura S Weiner
(74) *Attorney, Agent, or Firm*—Russell H. Toye, Jr.

(57) ABSTRACT

An alkaline electrochemical cell containing a neat multiphase thermoplastic polymer separator is disclosed. The microstructure and composition of the polymer are selected to provide a film that can physically endure the rigors of a cell assembly process and also provide adequate ionic conductivity to support a high rate discharge. In one embodiment, the ionic conductivity of the separator is improved upon contact with the cell's alkaline electrolyte. Processes that can be used to manufacture a cell of this invention are also described.

41 Claims, 4 Drawing Sheets

THERMOPLASTIC SEPARATOR FOR ALKALINE ELECTROCHEMICAL CELLS AND PROCESSES FOR THE PRODUCTION THEREOF

BACKGROUND OF THE INVENTION

This invention generally relates to a separator for electrochemical cells and processes for assembling cells with a separator of this invention. More particularly, this invention is concerned with a thermoplastic separator for use in an electrochemical cell having an alkaline electrolyte.

Cylindrically shaped batteries are suitable for use by consumers in a wide variety of devices such as flashlights, radios and cameras. Batteries used in these devices typically employ a cylindrical metal container to house two electrodes, a separator, a quantity of electrolyte and a seal assembly. Typical electrode materials include manganese dioxide as the cathode and zinc as the anode. The zinc is commonly employed in particulate form suspended in a gel. An aqueous solution of potassium hydroxide is a well known electrolyte. A separator, conventionally formed from one or more strips of paper, is positioned between the electrodes. The electrolyte is readily absorbed by the separator and gelling medium.

One of the essential components of the battery is the separator which must prevent direct electrical contact between the anode and cathode while providing for ionic conductivity therebetween. If the anode and cathode are allowed to physically contact one another, a chemical reaction takes place and the useful electrochemical capacity of the battery is wasted.

In addition to providing an electrically nonconductive and, at the same time, an ionically permeable barrier between the electrodes, a preferred separator must also satisfy several other criteria. First, because the separator does not contribute to the electrochemical capacity of the battery and the volume of most commercially available batteries is limited by industry standards, the separator should occupy the smallest possible volume in order to maximize the volume within the cell that can be occupied by the anode, cathode or electrolyte. To achieve this objective, the ideal separator will be a single layer of thin material that closely adheres to the surfaces of the anode and/or cathode thereby functioning as the interface between the electrodes. Second, a preferred separator can conform to irregularly shaped electrode surfaces. For example, if the interface between the anode and cathode is an undulating surface having recesses and/or projections, the separator must be able to conform to the surfaces of the electrode without tearing, wrinkling or otherwise distorting in an unacceptable manner. Third, the separator's ionic conductivity must be high enough to support the rate of ionic exchange needed to enable high rate discharge of the battery. Fourth, the separator must be tough enough to withstand the rigors of a commercial battery assembly process without tearing or splitting. Fifth, the separator must be able to withstand unacceptable chemical degradation by any of the cell's other components such as the caustic electrolyte or one of the electrode's electrochemically active materials. Sixth, the separator should be melt processable into a wide variety of three dimensional shapes thereby facilitating the use of cell constructions, such as prismatic cells or pouch cells, that do not have a tubularly shaped anode to cathode interface. Seventh, the separator should be processable in commercially available manufacturing equipment, such as an extruder, to enable low cost manufacturing.

A common separator used in commercially available cylindrical alkaline batteries is a strip of paper that has been wound to form a tube. One end of the tube is left open, while the opposite end is sealed or otherwise closed. Unfortunately, a separator formed from a wound tube of paper does not completely satisfy many of the criteria described above. For example, the tube usually incorporates at least two layers of paper thereby resulting in a separator thickness, prior to soakup of electrolyte, of 0.13 mm or more. Although the wound tube is structurally rigid and thus well suited for cell constructions with a tubularly shaped anode-to-cathode interface, the wound tube cannot conform to cell constructions with an irregularly shaped anode-to-cathode-interface. Furthermore, a strip of conventional separator cannot be readily configured into a variety of three dimensional shapes.

Due to the significant economic and technical advantages that can be realized by developing a separator with many of the desirable features described above, separators that incorporate some of the desired characteristics have been developed and documented in the following patents.

U.S. Pat. No. 4,315,062 is directed to a method of forming a separator for use in an electrochemical cell by dissolving polystyrene resin in a solvent to form a solution, placing the solution directly on the surface of the cathode and then removing the solvent thereby leaving a thin, substantially continuous coating on the exposed surface of the cathode. The required use of a solvent is an undesirable step because of the potential environmental hazards that could be created when handling some of the solvents, such as benzene or toluene, which were disclosed in the subject patent as suitable solvents.

FR 2,463,513 discloses a polymer separator resulting from copolymerization of at least one hydrophilic monomer, at least hydrophobic monomer, as well as at least one divinyl monomer. The divinyl monomers are well known crosslinking agents that would inherently cause crosslinking of the hydrophilic and hydrophobic monomers. A crosslinked polymer is not thermoplastic and therefore the polymer cannot be extruded or otherwise physically altered in a melt processable process to obtain a separator that has a desired three dimensional configuration.

U.S. Pat. No. 4,285,751 describes a battery separator that is a thin sheet formed from a substantially uniform mixture of a thermoplastic rubber and a filler in a volume ratio of from about 1:0.15 to 1:0.6. The separator exhibits good electrical conductivity and a high degree of inhibition to dendrite formation. The fillers may be any ingredient which is substantially chemically inert with respect to the electrolyte to which it is to come into contact.

Despite these inventions, there remains a need for a thermoplastic polymer separator that can satisfy the criteria described above when used as a separator in an electrochemical cell that includes an alkaline electrolyte.

BRIEF SUMMARY OF THE INVENTION

This invention relates to an alkaline electrochemical cell having a thermoplastic polymer separator. The polymer's microstructure and composition provide the separator with the physical and chemical characteristics needed to function in an alkaline cell.

In one embodiment, this invention is an electrochemical cell including a container, a first electrode, a second electrode, an alkaline electrolyte and a separator. The container defines a cavity therein. The first electrode, which is located within the cavity, contacts the container. The electrolyte is in contact with the electrodes. The separator, which is located between the electrodes and physically isolates them from one another, is a neat multiphase thermoplastic polymer.

In another embodiment, this invention is an electrochemical cell that includes a first electrode, a second electrode, an alkaline electrolyte and a separator. The separator is a polymer which is a reaction product of a monomer, shown below, of formula I a monomer, shown below, of formula II or salt thereof, and a monomer, shown below, of formula III wherein $R^1$, $R^2$, $R^3$, $R^6$, $R^7$, $R^8$, $R^9$, $R^{10}$ and $R^{11}$ are selected from a group consisting of a hydrogen atom, an alkyl group having from one to ten carbon atoms, an aryl group; $R^4$ is selected from the group consisting of oxygen and amine group, $R^5$ is selected from the group consisting of an alkyl group having from one to twelve carbon atoms, and an aryl group; $R^{12}$, is selected from a group consisting of a hydrogen atom, a hydroxyl group, and an alkyl group having from one to ten carbon atoms; and $A^1$, $A^2$ and $A^3$ are selected from the group consisting of a direct bond and an alkyl or alkoxy group having up to eight carbon atoms.

In yet another embodiment, this invention is a process for manufacturing an electrochemical cell. The process includes the following steps. Providing an electrode subassembly including a container and a first electrode located within the container. The first electrode defines a cavity within the container and contacts the container. In another step, providing a second electrode that includes electrochemically active material encapsulated by a neat multiphase thermoplastic polymer. In another step, the encapsulated second electrode is disposed in the container and located adjacent the first electrode. In another step, electrolyte is disposed into the container. The electrolyte contacts the thermoplastic polymer. In another step, closing the container.

In yet another embodiment, the invention is a process for manufacturing an electrochemical cell. The process includes the following steps. Providing an electrode subassembly including a container and a first electrode located within the container. The first electrode defines a cavity within the container and contacts the container. In another step, disposing within the cavity a neat multiphase thermoplastic polymer. The polymer contacts the first electrode and defines an interior region within the cavity. The interior region is electrically isolated from the first electrode by the multiphase thermoplastic polymer. In another step, a second electrode, including an electrochemically active material, is disposed into the interior region. In another step, electrolyte is disposed into the container. The electrolyte contacts the thermoplastic polymer. In another step, closing the container.

DETAILED DESCRIPTION OF THE INVENTION

Figure 1:
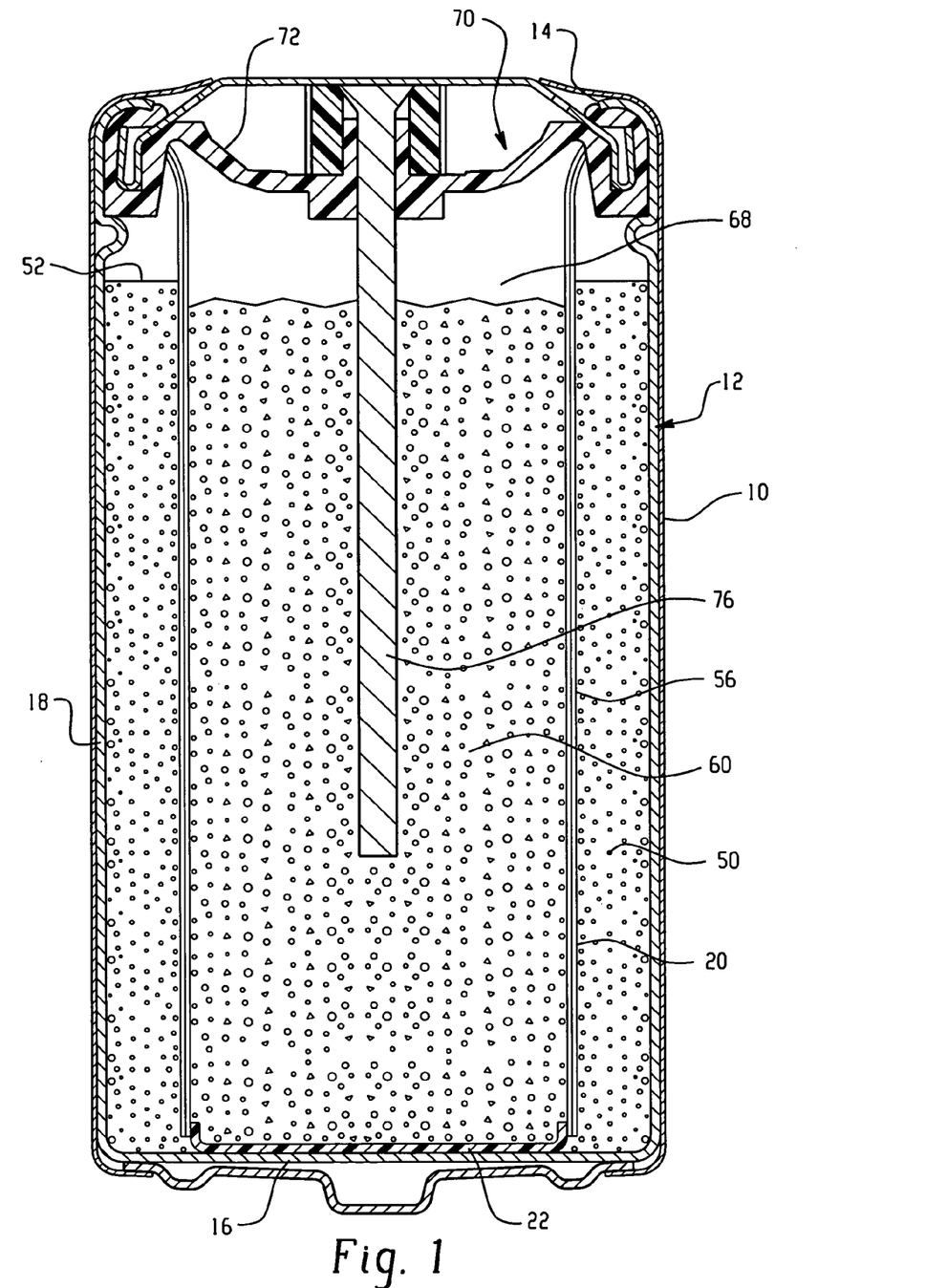
FIG. 1 is a cross-sectional view of a conventional alkaline electrochemical cell.

Referring now to the drawings and more particularly to FIG. 1, there is shown a cross-sectional view of a conventional electrochemical cell. Beginning with the exterior of the cell, the cell components are the label 10, container 12, first electrode 50 positioned adjacent the interior surface of container 10, separator 20 contacting the interior surface 56 of first electrode 50, second electrode 60 disposed within the interior region 68 defined by separator 20. Closure assembly 70 is secured to container 12 which has an open end 14, a closed end 16 and a sidewall 18 therebetween. The closed end 16, sidewall 18 and seal assembly 70 define the volume in which the cell's electrodes are housed.

First electrode 50 is a mixture of manganese dioxide, graphite and an aqueous solution containing potassium hydroxide. The electrode is formed by disposing a quantity of the mixture into the open ended container and then using a ram to mold the mixture into a solid tubular shape that defines a cavity which is concentric with the sidewall of the container. First electrode 50 has a ledge 52 and an interior surface 56. Alternatively, the cathode may be formed by preforming a plurality of rings from the mixture comprising manganese dioxide and then inserting the rings into the container to form the tubularly shaped first electrode.

Second electrode 60 is a homogenous mixture of an aqueous alkaline electrolyte, zinc powder, and a gelling agent such as crosslinked polyacrylic acid. The aqueous alkaline electrolyte comprises an alkaline metal hydroxide such as potassium hydroxide, sodium hydroxide, or mixtures thereof. Potassium hydroxide is preferred. The gelling agent suitable for use in a cell of this invention can be a crosslinked polyacrylic acid, such as Carbopol 940®, which is available from Noveon which is located in Cleveland, Ohio, USA. Carboxymethylcellulose, polyacrylamide and sodium polyacrylate are examples of other gelling agents that are suitable for use in an alkaline electrolyte solution. The zinc powder may be pure zinc or an alloy comprising an appropriate amount of one or more of the metals selected from the group consisting of indium, lead, bismuth, lithium, calcium and aluminum. A suitable anode mixture contains 67 weight percent zinc powder, 0.50 weight percent gelling agent and 32.5 weight percent alkaline electrolyte having 40 weight percent potassium hydroxide. The quantity of zinc can range from 63 percent by weight to 70 percent by weight of the anode. Other components such as gassing inhibitors, organic or inorganic anticorrosive agents, binders or surfactants may be optionally added to the ingredients listed above. Examples of gassing inhibitors or anticorrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like.

The second electrode may be manufactured by combining the ingredients described above into a ribbon blender or drum mixer and then working the mixture into a wet slurry.

Electrolyte suitable for use in a cell of this invention is a thirty-seven percent by weight aqueous solution of potassium hydroxide. The electrolyte may be incorporated into the cell by disposing a quantity of the fluid electrolyte into the cavity defined by the first electrode. The electrolyte may also be introduced into the cell by allowing the gelling medium to absorb an aqueous solution of potassium hydroxide during the process used to manufacture the second electrode.

Seal assembly 70 comprises closure member 72 and current collector 76. Closure member 72 is molded to contain a vent 82 that will allow the closure member 72 to rupture if the cell's internal pressure becomes excessive. Closure member 72 may be made from Nylon 6,6 or another material, such as a metal, provided the current collector 76 is electrically insulated from the container 12 which serves as the current collector for the first electrode. Current collector 76 is an elongated nail shaped component made of brass. Collector 76 is inserted through a centrally located hole in closure member 72.

Separator 20 is made from nonwoven fibers. One of the separator's functions is to provide a barrier at the interface of the first and second electrodes. The barrier must be electrically insulating and ionically permeable.

Figure 2:
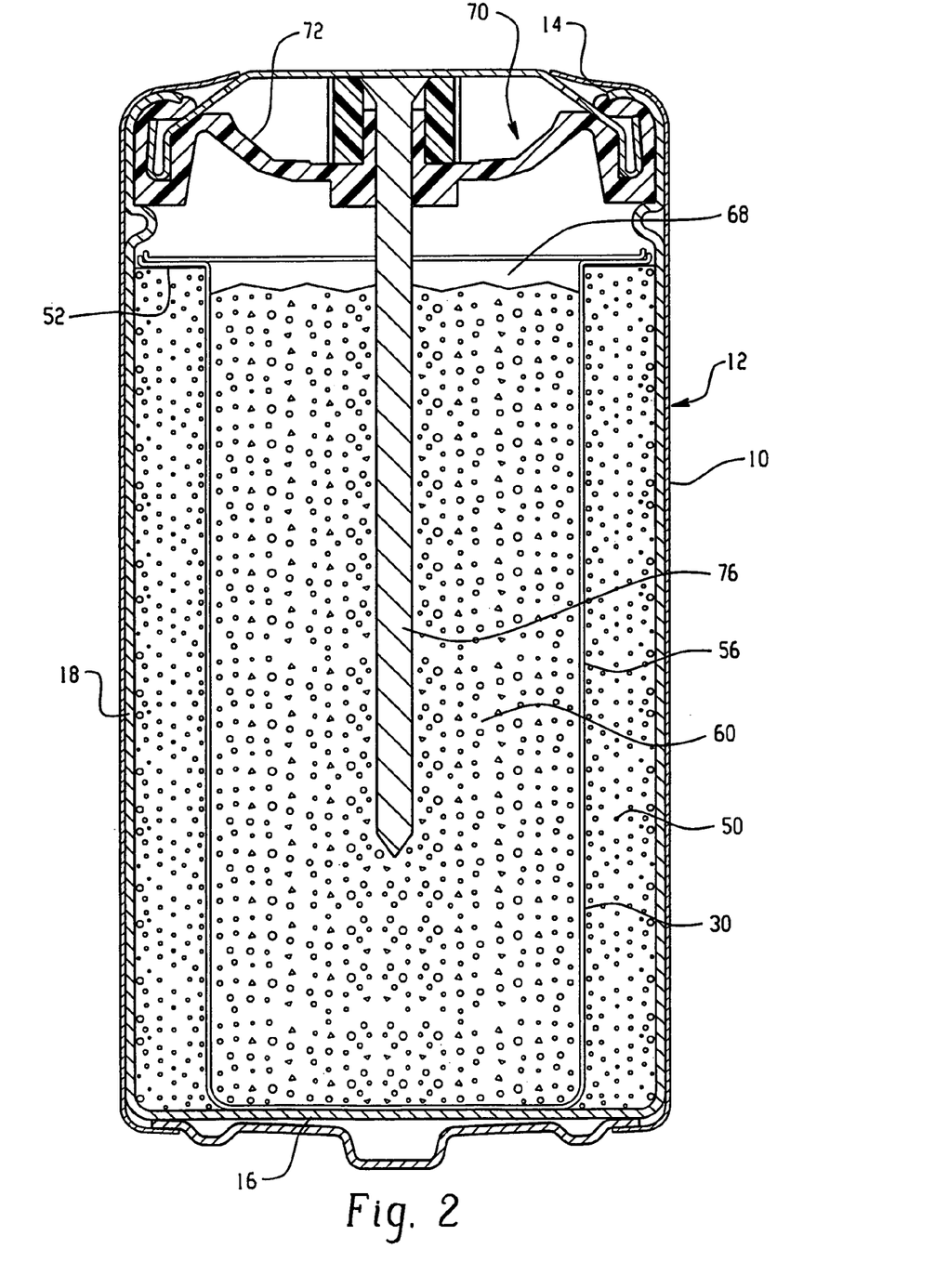
FIG. 2 is a cross-sectional view of an alkaline electrochemical cell of this invention.

Shown in FIG. 2 is a cross sectional view of an electrochemical cell of this invention. The key distinction between FIG. 1 and FIG. 2 is the separator. In FIG. 1, separator 20 is a wound tube that was formed by coiling a single strip of separator material two times around a rod having an outside diameter that was slightly smaller than the inside diameter of first electrode 50. The wound tube was then removed from the rod and inserted into the cavity defined by first electrode 50. Plug 22 was inserted into the tube and seated against the container's closed end 16. The diameter of the plug was selected to form an interference fit with the inside diameter of separator 20. Plug 22 must be made of an electrically nonconductive material. In contrast to separator 20 in FIG. 1, separator 30 in FIG. 2 is a single layer of a formed multiphase thermoplastic film. In this embodiment, separator 30 encapsulates second electrode 60. Separator 30 also has a closed end 34 that abuts the closed end 16 of container 12.

Separator 30 is a noncrosslinked polymer that was manufactured by polymerizing three chemically distinct monomers to form a terpolymer with a neat multiphase microstructure. One of the monomers was specifically selected to produce a polymer with chemically reactive pendant groups that would react with the cell's aqueous caustic electrolyte to cause a change in the separator's ionic conductivity after the separator and electrolyte were inserted into the cell's container and allowed to contact one another.

A preferred separator useful in a cell of this invention is a neat multiphase thermoplastic polymer film. As used herein, the term "neat" means that the polymer is free from fillers such as carbon black, coal dust, graphite, aluminum oxide, magnesium oxide and titanium dioxide. A polymer is considered to be "thermoplastic" if it can be heated or dissolved without changing the polymer's chemical structure and then formed into a shape a multiple number of times. As used herein, a polymer is defined to be a multiphase polymer if the polymer has (1) a first phase with a first physical morphology and a first polymeric chemical composition, (2) a second phase with a second physical morphology and a second polymeric chemical composition, and (3) the first chemical composition is different from the second chemical composition. Because both phases are polymeric materials, the polymer chemistry of one phase must be different from the polymer chemistry of the other phase. Chemical bonding, such as covalent bonds, may link one phase to the other phase. The existence of two or more phases enables performance advantages in a multiphase polymer that cannot readily be obtained with a polymer that has one or multiple physical morphologies but a homogenous chemical composition. For example, if a polymer has only a crystalline phase and an amorphous phase, then the polymer is not a multiphase polymer as defined herein. In contrast, a preferred polymer for use in a cell of this invention is a polymer that has an acrylic acid rich first phase and the second phase is a continuous styrene rich phase. The first phase provides domains of high ionic conductivity throughout the separator. The second phase provides the melt processibility and dimensional stability needed to make the polymer thermoplastic and sufficiently durable to withstand the rigors of a cell assembly process and the environment within the cell.

In a preferred embodiment, the ionic conductivity of a separator useful in a cell of this invention is increased after contacting the cell's alkaline electrolyte, relative to the ionic conductivity of the same separator prior to contacting the alkaline electrolyte. For example, prior to contacting the electrolyte, a neat thermoplastic film useful in a cell of this invention has an ionic conductivity of less than 1 mS/cm. The same separator, after soaking in 40 weight percent KOH electrolyte for ten days at room temperature, may have an ionic conductivity of 7 mS/cm or greater. The ionic conductivity of a separator can be measured with two platinum electrodes submerged in 40% KOH at 25° C. and impedance is measured at 1 kHz. The increase in ionic conductivity is due to a chemical change and absorption of electrolyte in the polymer which causes a substantial increase in the ionic conductivity of the polymer by converting an ionically nonconductive portion of the polymer to an ionically conductive entity. Diffuse reflectance FTIR spectroscopy can be used to detect the chemical conversion of the polymer.

In a preferred embodiment, a separator useful in a cell of this invention is a terpolymer that is a reaction product of a first monomer, identified herein as monomer I, a second monomer, identified herein as monomer II, and a third monomer, identified herein as monomer III. Monomer I is selected for its ability to polymerize with monomers II and III to form a terpolymer, which, upon contact with an aqueous alkaline solution, reacts with the solution thereby altering the chemical composition of the polymer and resulting in an increase in the separator's ionic conductivity. The portion of monomer I that chemically reacts with the electrolyte to cause an increase in the separator's ionic conductivity is a chemically reactive pendant group. The general chemical structure of monomer I is:

A monomer suitable for use as monomer I can be selected from the following list: methyl acrylate; ethyl acrylate; n-propyl acrylate; n-butyl acrylate; tertiary butyl acrylate; n-hexyl acrylate; n-dodeclacrylamide; noxtadecylacrylamide; n-octylacrylamide; methacrylate; n-butyl methacrylate; 2-phenoxy ethylacrylate; 2-phenoxy methacrylate; decyl methacrylate; dodecyl methacrylate; 2-ethylhexyl methacrylate; hexyl methacrylate; hexadecyl methacrylate; isobutyl methacrylate; isopropyl methacrylate; octadecyl methacrylate; propyl methacrylate; tetra decylmethacrylate; acrylamide; vinyl benzoate and ethyl ethacrylate.

Monomer II is a hydrophilic monomer. The general chemical structure of monomer II is:

A suitable hydrophilic monomer can be selected from the following list: acrylic acid, methacrylic acid, crotonic acid, isocrotonic acid, 2-, 3- and 4-pentenoic acid, 2,3-,4- and 5-hexenoic acid, the heptenoic acids, the octenoic acids, the nonenoic acids, the decanoic acids, the undecenoic acids, the dodecenoic acids, the tridecenoic acids, the tetradecenoic acids, the pentadecenoic acids, the hexadecenoic acids, the heptadecenoic acids, the octadecenoic acids; the nonadecenoic acids; the isosenoic acids, and corresponding alkali salts thereof.

Monomer III is a hydrophobic monomer.

A suitable hydrophobic monomer can be selected from the following list: styrene, methyl styrene, butyl styrene, propyl styrene, butyl styrene, 4-tert-butoxy styrene, 4-tert-butyl-styrene, 2,5 dimethyl styrene, 2-methoxy styrene and p-acetoxy styrene.

The use of three monomers to produce a separator facilitates the objective of this invention which is to provide a neat multiphase thermoplastic separator that is capable of providing sufficient ionic conductivity to support high rate discharge of an alkaline electrochemical cell and, at the same time, the separator must be able to withstand undesirable physical and/or chemical degradation both before and after it has been assembled into a cell. A neat multiphase melt processible separator is particularly preferred. The separator used in a cell of this invention achieves the desired objective by polymerizing a polymer from monomers with specific characteristics that will be described below. The combination of monomers must be selected to satisfy competing and/or opposing criteria.

A separator useful in cell of this invention may be a reaction product of the three monomers described above. One of the monomers, defined above as monomer I, contributes to the toughness of the separator during the separator manufacturing and cell assembling processes and then, upon contact with an aqueous alkaline solution, such as the cell's electrolyte, the monomer undergoes a chemical reaction, such as saponification, which increases the ionic conductivity of the separator. For example, the alkaline electrolyte could hydrolyze at least a portion of monomer I, known herein as pendant groups, thereby generating reaction products, such as acrylic acid, that improve the separator's ionic conductivity. Monomer I must contain pendant groups which will react with an aqueous alkaline solution to produce a reaction product that increases the ionic conductivity of the polymer film. Acrylates contain preferred pendant groups. Preferably, the quantity of monomer I in the solution used to manufacture the polymer is between 10 mol percent and 60 mol percent. More preferably, the quantity of monomer I is between 25 mol percent and 50 mol percent. If the quantity of monomer I is too low, the toughness of the polymer film will be too low and the internal resistance will be too high. A high internal resistance will adversely impact the cell's run time which is the length of time that a battery will adequately power a battery operated device such as a digital camera or a handheld electronic game.

The second monomer, defined above as monomer II, is a hydrophilic monomer that contributes to the ionic conductivity throughout the polymer film. The quantity of monomer II in the solution used to manufacture the polymer must be less than 35 mol percent. If the quantity of monomer II exceeds 35 mol percent, the resulting polymer may not be physically stable when exposed to storage conditions, such as an ambient temperature of 71° C., which the cell must be able to survive and it may inhibit the melt processibility of the polymer. If the quantity of monomer II is less than 5 mol percent, then the ionic conductivity of the resulting polymer is too low for the polymer to function as a separator in an electrochemical cell. Therefore, the preferred quantity of monomer II is between 5 and 35 mol percent. A more preferred range is between 10 and 25 mol percent.

The third monomer, defined above as monomer III, is a hydrophobic monomer that provides the separator with the melt processibility and dimensional stability needed to withstand the rigors of cell assembly as well as the conditions within the assembled cell. Preferably, the quantity of monomer III used to manufacture the polymer is between 30 and 80 mol percent. More preferably, the quantity of monomer III in the solution is between 40 mol percent and 70 mol percent. If the quantity of monomer III exceeds 80 mol percent, the ionic conductivity of the polymer of the polymer is too low to enable the polymer to be used as a separator and the separator may be too brittle to prevent cracking during the cell assembly and separator production processes. If the quantity of monomer III is less than 30 mol percent, the polymer may not be durable enough to resist physical and chemical damage when used as a separator in an alkaline electrochemical cell.

The process used to manufacture a polymer film suitable for use in a cell of this invention will now be described. First, the following monomers were obtained and disposed into a 500 ml glass reaction vessel: 94.5 ml of butyl acrylate (monomer I); 17.0 ml of acrylic acid (monomer II); 85.0 ml of styrene (monomer III); 284 ml of deionized water; and 5.65 g of poly(ethylene glycol) which may be identified herein as PEG. The PEG functions as a suspension stabilizer. The impellor portion of a mixer was inserted into the solution and the reaction vessel was closed. While stirring the solution with the impellor, the solution was heated and argon gas was used to purge oxygen from the solution. When the solution reached 80° C., 0.812 g of 2,2' azobisisobutyronitrile (AIBN) was added. The AIBN functioned as a polymerization initiator. After adding the initiator, the temperature of the vessel was maintained at 80° C. and the solution was stirred for six hours under an argon atmosphere. At the end of the six hours, the vessel was allowed to cool and then opened. A white solid polymer and residual liquid remained in the reaction kettle. The polymer was removed from the kettle, broken into several pieces and placed in a vacuum oven. The polymer was dried at room temperature for 24 hours. The temperature in the vacuum oven was increased to 45° C. and the polymer was dried another day. The polymer was then disposed into a blender and ground into a powder. The powder was placed back into the vacuum oven to continue drying. The dried powder was mixed with 0.1 weight % ANOX™ BB110 (available from Great Lakes Chemical in West Lafayette, Ind., USA) which is an antioxidant that was added to improve processing stability. The powder mixture was then stirred by hand to insure homogeneity. Approximately 0.3 g of the mixture was poured onto a thin teflon coated aluminum sheet that had been placed onto a Carver Press', model C, heated chrome plate. A second teflon sheet was placed over the sample and another chrome plate was placed on top of the second teflon sheet. The teflon sheets with the powder in between were then inserted between the Carver Press' platens which had been preheated to 182° C. The press was used to exert approximately 1.7 MPa of pressure on the Teflon sheets for approximately one minute. After releasing the pressure, the film was allowed to cool before it was removed from between the teflon sheets.

After removal from between the platens, the film was approximately 0.06 mm thick. The film was trimmed to form a rectangle that measured approximately 2.15 cm wide and 5.35 cm long. The rectangular film was rolled around a mandrel and then heat sealed along the side and bottom seams thereby forming a cylinder with one open end. The cylindrically shaped film basket was inserted into an electrode subassembly that included a container and a first electrode that contacted the container and formed a centrally located cavity. The space defined by the shaped film basket is known herein as the "interior region". Next, a 0.89 g quantity of 36.5 weight percent KOH solution was dispensed into the basket and allowed to soak into the film and first electrode. A 6.58 g quantity of a gelled anode was disposed into the basket. A 0.13 g quantity of 36.5 weight percent KOH electrolyte was disposed into the basket. A seal assembly was secured to the open end of the container thereby forming a sealed electrochemical cell.

Figure 3:
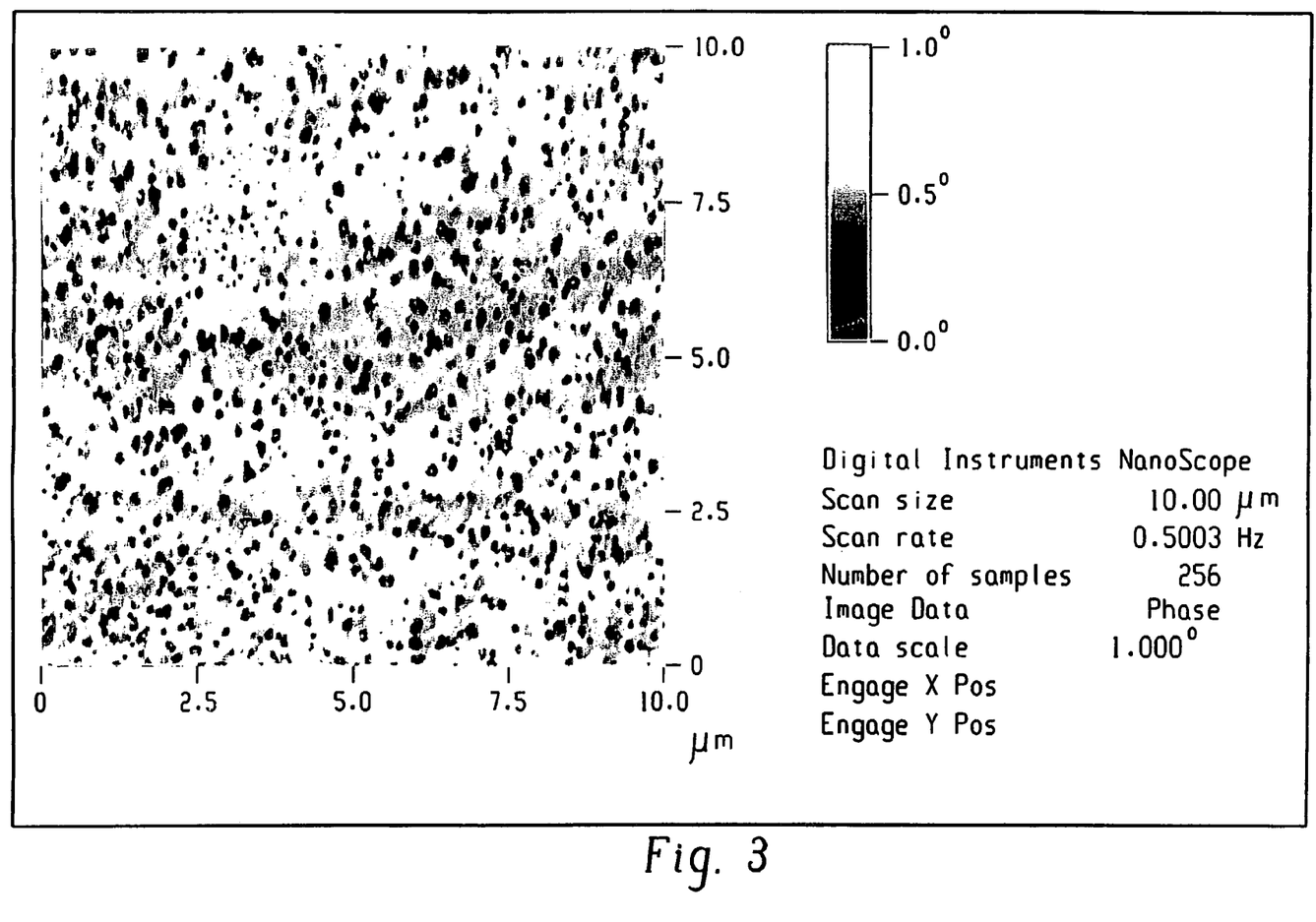
FIG. 3 shows an Atomic Force Microscopy phase image of a two phase thermoplastic polymer film useful in a cell of this invention.

A preferred separator for use in a cell of this invention is a continuous thermoplastic polymer film having a two phase microstructure. One of the phases must be ionically conductive. The other phase may be ionically conductive or ionically nonconductive. As used herein, the term "continuous" means that there are no visible pin holes in the surface of the film when it is examined via a scanning electron microscope at 1000× magnification. In contrast, conventional nonwoven separators are formed from a random array of fibers that inherently form cavities that are visible to the human eye without magnification. Collectively, the cavities form a tortuous path through the fibrous separator. The existence of a two phase microstructure can be confirmed using Atomic Force Microscopy to create a phase image such as the one shown in FIG. 3 wherein the small spots are the acrylic acid rich phase that provides the film's ionic conductivity and the phase represented by the background is the styrene rich phase which provides the film's dimensional stability.

A thermoplastic polymer film useful as a separator in a cell of this invention may have a thickness between 0.0025 mm and 0.60 mm. Preferably, the film's thickness will be between 0.010 mm and 0.100 mm.

A preferred separator for use in a cell of this invention is substrate free. While a neat multiphase thermoplastic polymer film could be secured to a porous substrate, the existence of the substrate detracts from the volume and cost advantages made possible by using only the neat thermoplastic polymer film as the sole separator material.

Figure 4:
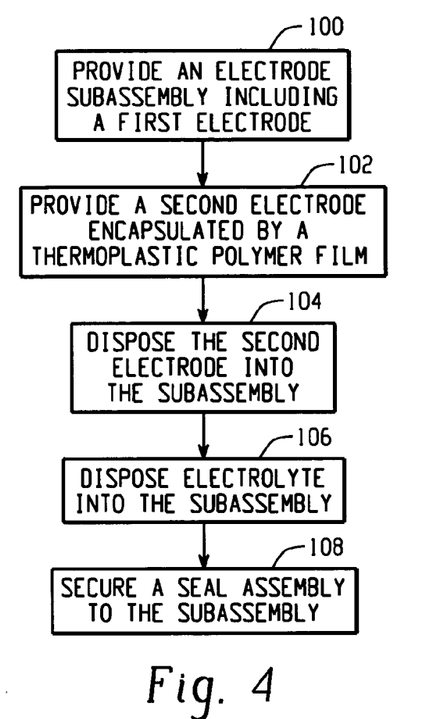
FIG. 4 shows the steps in a first process used to produce a cell of this invention.

A first process that can be used to assemble a cell of this invention will now be described. The process steps are shown in FIG. 4. In step 100, an electrode subassembly is provided. The subassembly includes a container having an open end, a closed end and a sidewall therebetween. A first electrode comprising manganese dioxide and graphite is formed against the interior surface of the container and defines a centrally located cavity therein. In step 102, a gelled second electrode that has been encapsulated by a neat multiphase thermoplastic polymer film is provided. The second electrode is encapsulated, for example, by disposing a quantity of the second electrode and electrolyte into a formed cup made by blow molding the polymer into a tubularly shaped cavity that has a closed end and an open end. After the second electrode is disposed into the polymer lined cavity, the open end of the cup is sealed with the neat multiphase polymer thereby encapsulating the second electrode. The second electrode is a mixture that includes zinc powder and may or may not include electrolyte. In step 104, the encapsulated second electrode is disposed into the container and positioned adjacent the first electrode. In step 106, electrolyte is disposed into the container. The electrolyte contacts the thermoplastic polymer film. A seal assembly is secured to the open end of the container in step 106.

Figure 5:
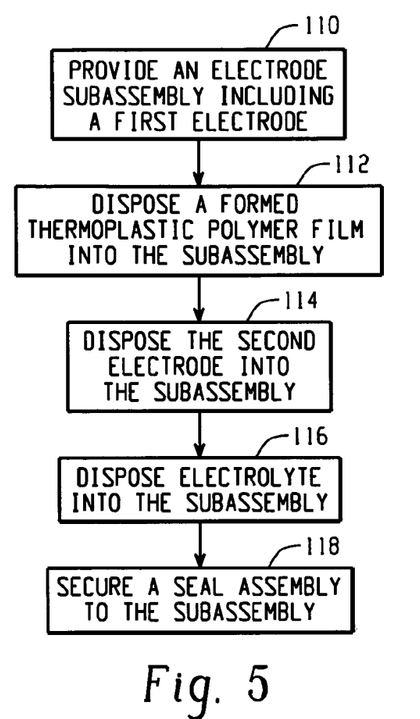
FIG. 5 shows the steps in a second process used to produce a cell of this invention.
Figure 6:
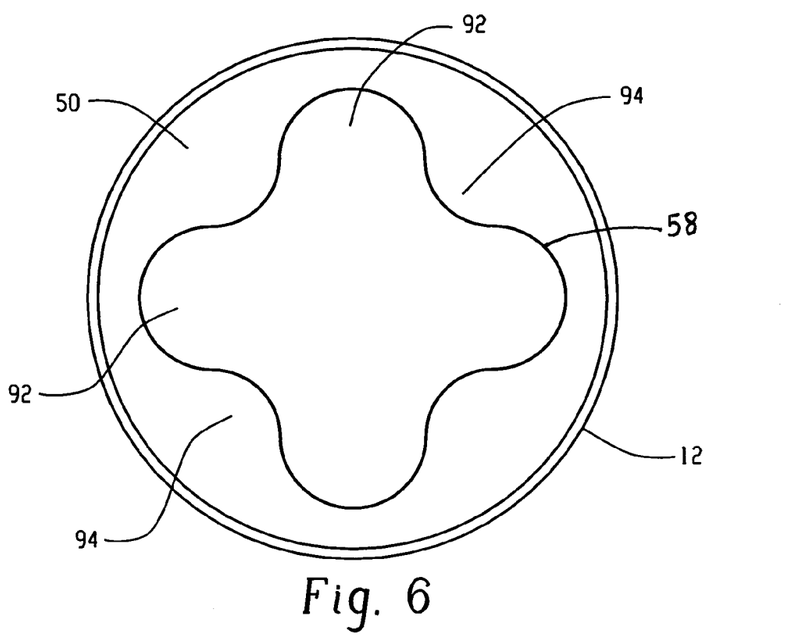
FIG. 6 is a top view of an electrode subassembly useful in a cell of this invention.

A second process that can be used to assemble a cell of this invention will now be described. The process steps are shown in FIG. 5. In step 110, an electrode subassembly, such as the one described above, is provided. The cavity defined by the first electrode may be tubularly shaped and concentrically aligned with the container's open end. Alternatively, the cavity may have an undulating cross-sectional surface 58 as shown in FIG. 6 wherein first electrode 90 includes concave shaped recesses 92 and protrusions 94 that increase the interfacial surface area between the first and second electrodes relative to the interfacial surface area between the electrodes when the cavity defined by the first electrode is tubularly shaped. In step 112, a cup shaped separator, formed from a neat multiphase thermoplastic polymer film is disposed into the cavity defined by the first electrode. The cup may be formed by blow molding, vacuum forming, continuous vacuum forming or thermoforming. The film contacts the first electrode and defines an interior region within the cavity. The interior region is electrically isolated from the first electrode by the thermoplastic film. The film may be a terpolymer that includes chemically reactive pendant groups that will react with the cell's electrolyte to generate reaction products that increase the polymer film's ionic conductivity. For example, the pendant groups could undergo a saponification reaction wherein a portion of the butyl acrylate monomer in the polymer is converted to acrylic acid. In step 114, a second electrode is disposed into the interior region defined by the formed thermoplastic film. The second electrode contains electrochemically active material such as zinc powder. Electrolyte is disposed into the interior region in step 116. The electrolyte contacts the polymer film, first electrode and second electrode. Step 118, represents closing the container by securing a seal assembly to the open end of the container.

If desired, the ionic conductivity of the thermoplastic polymer film separator used in a cell of this invention can be improved by exposing the separator to a heated aqueous based caustic solution. For example, a completed electrochemical cell made by one of the processes described above may be heated to at least 50° C. for at least two days. If the cell is heated to a higher temperature, such as 60° C., the length of time that the cell remains at 60° C. may be decreased relative to the length of time that the cell would need to be heated at 50° C. Conversely, the cell could be heated to 40° C. or 30° C. but the length of time the cell must remain at either 40° C. or 30° C. would be greater than the length of time that the cell would need to be heated at 50° C. and achieve the same increase in ionic conductivity. The aqueous based caustic solution to which the separator is exposed should contain at least 25% by weight potassium hydroxide, sodium hydroxide or a combination of potassium hydroxide and sodium hydroxide.

Instead of heating a completed cell of this invention in order to increase the ionic conductivity of the neat multiphase thermoplastic polymer film separator contained therein, the same increase in the separator's ionic conductivity can be achieved by heating the separator in an aqueous based caustic solution before inserting the separator into the electrode subassembly.

Three D-size alkaline cells of the present invention and six control cells were assembled and discharged on a 250 mA constant current test apparatus. The cells measured approximately 33 mm in width and 60 mm in height. The separators used in the cells of this invention were neat multiphase thermoplastic polymer films that had been extruded to form a tube with a 0.5 mm to 0.6 mm wall thickness. The extruded polymer films were soaked for three weeks in a 37 weight percent KOH solution at 50° C. prior to assembling the cells. The control cells used three wraps of a conventional commercially available nonwoven cellulose based separator. All of the cells used manganese dioxide as the electrochemically active material in the first electrode and zinc powder as the electrochemically active material in the second electrode. The thermoplastic polymer film was polymerized from a mixture of polymers that included 35 mol percent butyl acrylate, 25 mol percent acrylic acid and 40 mol percent styrene. To a 1.0 volt cutoff, the cells of this invention provided an average of 2766 minutes of run time. In contrast, the control cells provided an average of 2656 minutes of run time.

Electrochemical cells of this invention are not limited to the elongated cylindrically shaped cell shown in FIG. 2. The use of other cell shapes, such as pouch cells, prismatic cells, or button cells, is feasible. Prismatic cells typically employ planar electrodes that are separated by a planar layer of separator. Button cells have a circular cross-section and the height of the cell is less than the diameter of the cell. Button cells use a nonwound layer of separator between the electrodes. Pouch cells use flexible films to form the cell's container.

I claim:

1. An electrochemical cell, comprising:
   a) a container defining a cavity therein;
   b) a first electrode located within said cavity;
   c) a second electrode disposed within said cavity;
   d) an alkaline electrolyte disposed within said cavity and contacting said electrodes; and
   e) a separator located between and physically isolating said electrodes from one another, said separator comprising a neat multiphase thermoplastic polymer.

2. The electrochemical cell of claim 1, wherein said neat multiphase thermoplastic polymer is a film comprising a first phase and a second phase.

3. The electrochemical cell of claim 2, wherein at least one phase is ionically conductive.

4. The electrochemical cell of claim 2, wherein said polymer film comprises at least two chemically distinct monomers that have been polymerized to form a copolymer.

5. The electrochemical cell of claim 4, wherein at least one of said monomers is hydrophilic and at least one of said monomers is hydrophobic.

6. The electrochemical cell of claim 2, wherein said polymer film comprises at least three chemically distinct monomers that have been polymerized to form a terpolymer.

7. The electrochemical cell of claim 6, wherein at least one of said monomers is hydrophilic and at least one of said monomers is hydrophobic.

8. The electrochemical cell of claim 1, wherein at least one of said phases comprises chemically reactive pendant groups that react with said electrolyte thereby causing changes in the polymer that increase the separator's ionic conductivity.

9. The electrochemical cell of claim 8, wherein said pendant groups are hydrolyzed by said electrolyte.

10. The electro chemical cell of claim 1, wherein said separator is substrate free.

11. The electrochemical cell of claim 1, wherein said separator is a single layer.

12. The electrochemical cell of claim 1, wherein said separator's thickness is between 0.0025 mm and 0.60 mm.

13. The electrochemical cell of claim 12, wherein said separator's thickness is between 0.010 mm and 0.100 mm.

14. The electrochemical cell of claim 1, wherein said polymer is formed by polymerizing monomers in a heterogeneous polymerization process.

15. The electrochemical cell of claim 14, wherein said polymerization process is a suspension polymerization process that comprises a suspension stabilizer.

16. The electrochemical cell of claim 15, wherein said suspension stabilizer is polyethylene glycol.

17. The electrochemical cell of claim 1, wherein said container comprises an open end, a closed end and a sidewall therebetween.

18. The electrochemical cell of claim 17, wherein said first electrode forms a tubularly shaped space that is concentrically aligned with the open end of said container.

19. The electrochemical cell of claim 18, wherein said separator is tubularly shaped and symmetrically positioned within said space.

20. The electrochemical cell of claim 1, wherein said first electrode comprises at least one protrusion.

21. The electrochemical cell of claim 1, wherein said container comprises flexible films.

22. The electrochemical cell according to claim 1, wherein the separator comprises a polymer that is a reaction product of:

a monomer, shown below, of formula (I)

a monomer, shown below, of formula (II) or salt thereof a monomer, shown below, of formula (III)

wherein $R^1$, $R^2$, $R^3$, $R^6$, $R^7$, $R^8$, $R^9$, $R^{10}$ and $R^{11}$ are selected from a group consisting of a hydrogen atom, an alkyl group having from one to ten carbon atoms, an aryl group; $R^4$ is selected from the group consisting of oxygen and amine group, $R^5$ is selected from the group consisting of an alkyl group having from one to twelve carbon atoms, and an aryl group; $R^{12}$, is selected from a group consisting of a hydrogen atom, a hydroxyl group, and an alkyl group having from one to ten carbon atoms, and $A^1$, $A^2$ and $A^3$ are selected from the group consisting of a direct bond and an alkyl or alkoxy group having up to eight carbon atoms.

23. The electrochemical cell of claim 22, wherein $A^1$, $A^2$ and $A^3$ are direct bonds and $R^1$, $R^2$, $R^3$, $R^6$, $R^7$, $R^8$, $R^9$, $R^{11}$ and $R^{12}$ are hydrogen atoms.

24. The electrochemical cell of claim 22, wherein:
a. the monomer of formula I is selected from the group consisting of: methyl acrylate; ethyl acrylate; n-propyl acrylate; n-butyl acrylate; tertiary butyl acrylate; n-hexyl acrylate; n-dodeclacrylamide; noxtadecylacrylamide; n-octylacrylamide; methacrylate; n-butyl methacrylate; 2-phenoxy ethylacrylate; 2-phenoxy methacrylate; decyl methacrylate; dodecyl methacrylate; 2-ethylhexyl methacrylate; hexyl methacrylate; hexadecyl methacrylate; isobutyl methacrylate; isopropyl methacrylate; octadecyl methacrylate; propyl methacrylate; tetra decylmethacrylate; acrylamide; vinyl benzoate and ethyl ethacrylate;
b. the monomer of formula II is selected from the group consisting of: acrylic acid, methacrylic acid, crotonic acid, isocrotonic acid, 2-, 3- and 4-pentenoic acid, 2,3-, 4- and 5-hexenoic acid, the heptenoic acids, the octenoic acids, the nonenoic acids, the decanoic acids, the undecenoic acids, the dodecenoic acids, the tridecenoic acids, the tetradecenoic acids, the pentadecenoic acids, the hexadecenoic acids, the heptadecenoic acids, the octadecenoic acids; the nonadecenoic acids and the isosenoic acids; and
c. the monomer of formula III is selected from the group consisting of: styrene, methyl styrene, butyl styrene, propyl styrene, butyl styrene, 4-tert-butoxy styrene, 4-tert-butyl-styrene, 2,5 dimethyl styrene, 2-methoxy styrene and p-acetoxy styrene.

25. The electrochemical cell of claim 24, wherein:
a. the monomer of formula I is selected from the group consisting of; methyl acrylate, ethyl acrylate, n-butyl acrylate and tertiary butyl acrylate
b. the monomer of formula II is selected from the group consisting of acrylic acid and methacrylic acid; and
c. the monomer of formula III is styrene.

26. The electrochemical cell of claim 25, wherein the monomer of formula (I) is n-butyl acrylate, the monomer of formula (II) is acrylic acid, and the monomer of formula (III) is styrene.

27. The electrochemical cell of claim 24, wherein the polymer comprises by weight:
a. from about 10 mol % to about 60 mol % of the monomer of formula I;
b. from about 5 mol % to about 35 mol % of the monomer of formula II; and
c. from about 30 mol % to about 80 mol % of the monomer of formula III.

28. The electrochemical cell of claim 22, wherein $R^4$ represents an oxygen atom.

29. The electrochemical cell of claim 22, wherein $R^5$ is an alkyl group having up to four carbon atoms.

30. A separator for an electrochemical cell comprising a neat multiphase thermoplastic polymer.

31. The separator of claim 30, wherein said polymer is a film comprising a first phase and a second phase.

32. The separator of claim 31, wherein at least one of said phases is ionically conductive.

33. The separator of claim 30 wherein the neat multiphase thermoplastic polymer comprises a polymer that is a reaction product of a monomer, shown below, of formula (I)

a monomer, shown below, of formula (II) or salt thereof a monomer, shown below, of formula (III)

wherein $R^1$, $R^2$, $R^3$, $R^6$, $R^7$, $R^8$, $R^9$, $R^{10}$ and $R^{11}$ are selected from a group consisting of a hydrogen atom, an alkyl group having from one to ten carbon atoms, an aryl group; $R^4$ is selected from the group consisting of oxygen and amine group, $R^5$ is selected from the group consisting of an alkyl group having from one to twelve carbon atoms, and an aryl group; $R^{12}$, is selected from a group consisting of a hydrogen atom, a hydroxyl group, and an alkyl group having from one to ten carbon atoms, and $A^1$, $A^2$ and $A^3$ are selected from the group consisting of a direct bond and an alkyl or alkoxy group having up to eight carbon atoms.

34. The separator of claim 33 wherein $A^1$, $A^2$ and $A^3$ are direct bonds and $R^1$, $R^2$, $R^3$, $R^6$, $R^7$, $R^8$, $R^9$, $R^{11}$ and $R^{12}$ are hydrogen atoms.

35. The separator of claim 33, wherein $R^4$ represents an oxygen atom.

36. The separator of claim 33, wherein $R^5$ is an alkyl group having up to four carbon atoms.

37. The separator of claim 33, wherein
a. the monomer of formula I is selected from the group consisting of: methyl acrylate; ethyl acrylate; n-propyl acrylate; n-butyl acrylate; tertiary butyl acrylate; n-hexyl acrylate; n-dodeclacrylamide; noxtadecylacryl amide; n-octylacrylamide; methacrylate; n-butyl methacrylate; 2-phenoxy ethylacrylate; 2-phenoxy methacrylate; decyl methacrylate; dodecyl methacrylate; 2-ethylhexyl methacrylate; hexyl methacrylate; hexadecyl methacrylate; isobutyl methacrylate; isopropyl methacrylate; octadecyl methacrylate; propyl methacrylate; tetra decylmethacrylate; acrylamide; vinyl benzoate and ethyl ethacrylate;
b. the monomer of formula II is selected from the group consisting of: acrylic acid, methacrylic acid, crotonic acid, isocrotonic acid, 2-, 3- and 4-pentenoic acid, 2,3-, 4- and 5-hexenoic acid, the heptenoic acids, the octenoic acids, the nonenoic acids, the decanoic acids, the undecenoic acids, the dodecenoic acids, the tridecenoic acids, the tetradecenoic acids, the pentadecenoic acids, the hexadecenoic acids, the heptadecenoic acids, the octadecenoic acids; the nonadecenoic acids and the isosenoic acids; and
c. the monomer of formula III is selected from the group consisting of: styrene, methyl styrene, butyl styrene, propyl styrene, butyl styrene, 4-tert-butoxy styrene, 4-tert-butyl-styrene, 2,5 dimethyl styrene, 2-methoxy styrene and p-acetoxy styrene.

38. The separator of claim 37, wherein:
a. the monomer of formula I is selected from the group consisting of; methyl acrylate, ethyl acrylate, n-butyl acrylate and tertiary butyl acrylate
b. the monomer of formula II is selected from the group consisting of acrylic acid and methacrylic acid; and
c. the monomer of formula III is styrene.

39. The separator of claim 33, wherein the monomer of formula (I) is n-butyl acrylate, the monomer of formula (II) is acrylic acid, and the monomer of formula (III) is styrene.

40. The separator of claim 33, wherein the polymer comprises by weight:
a. from about 10 mol % to about 60 mol % of the monomer of formula I;
b. from about 5 mol % to about 35 mol % of the monomer of formula II; and
c. from about 30 mol % to about 80 mol % of the monomer of formula III.

41. The separator of claim 30, wherein said neat multiphase thermoplastic polymer film is formed by polymerizing monomers in a heterogeneous suspension polymerization process that comprises a suspension stabilizer.

* * * * *